Oct. 30, 1928.
W. C. MILES
1,690,086
TRANSMISSION
Filed July 11, 1923
5 Sheets-Sheet 1
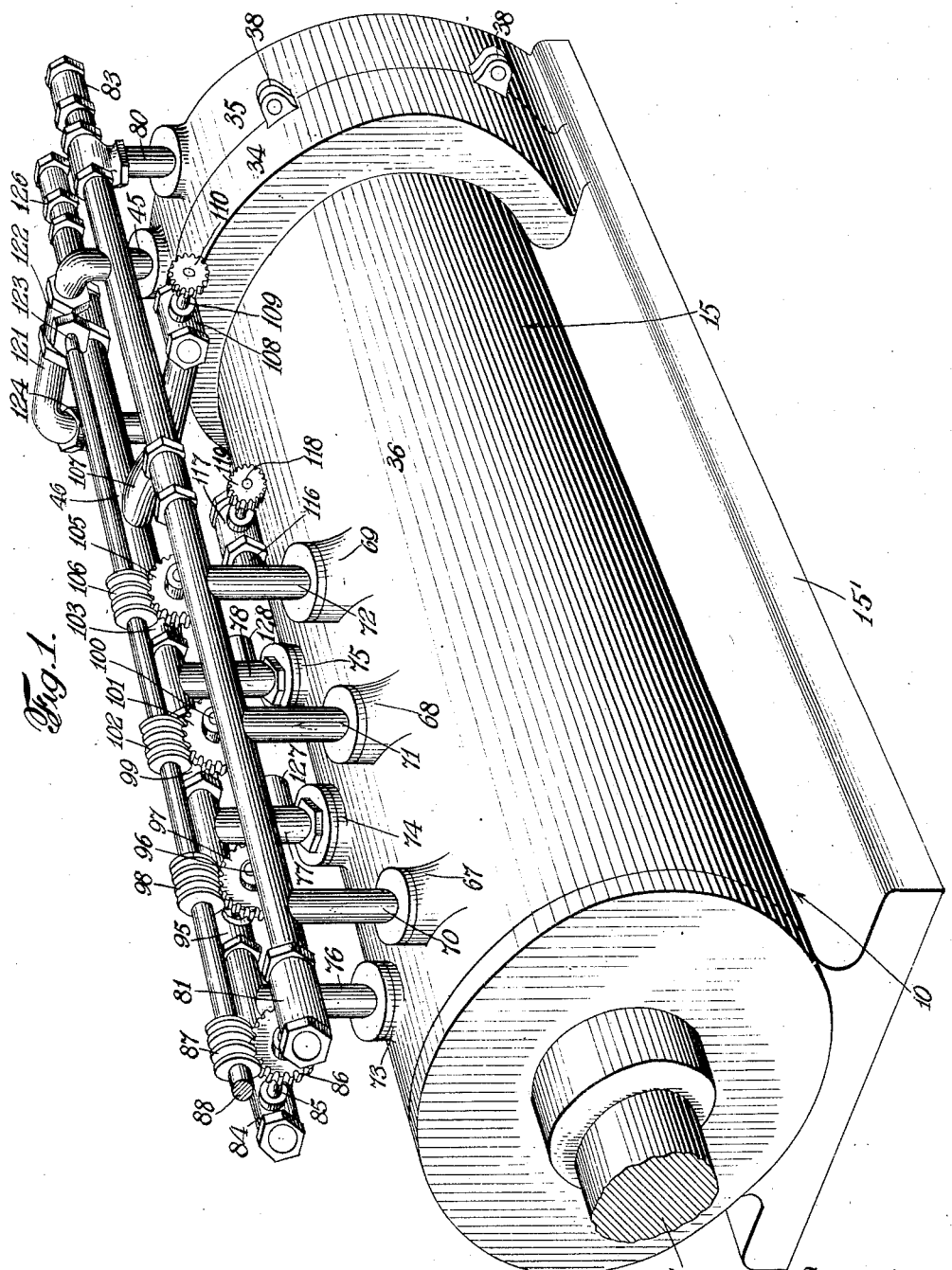

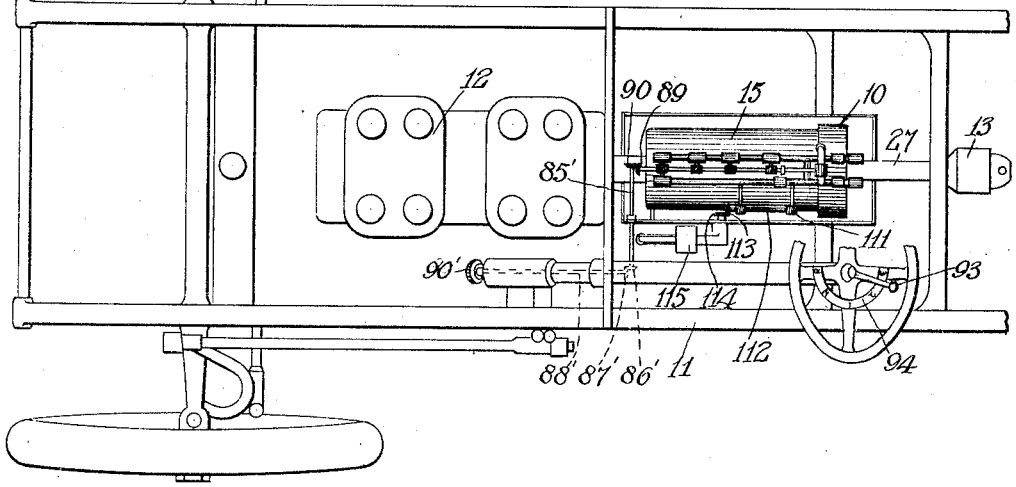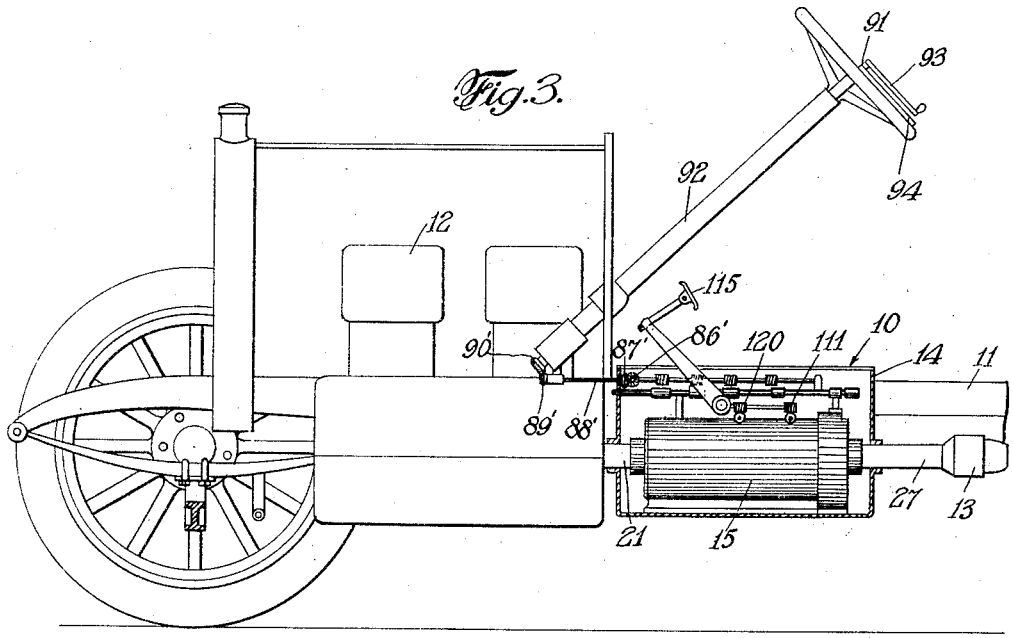

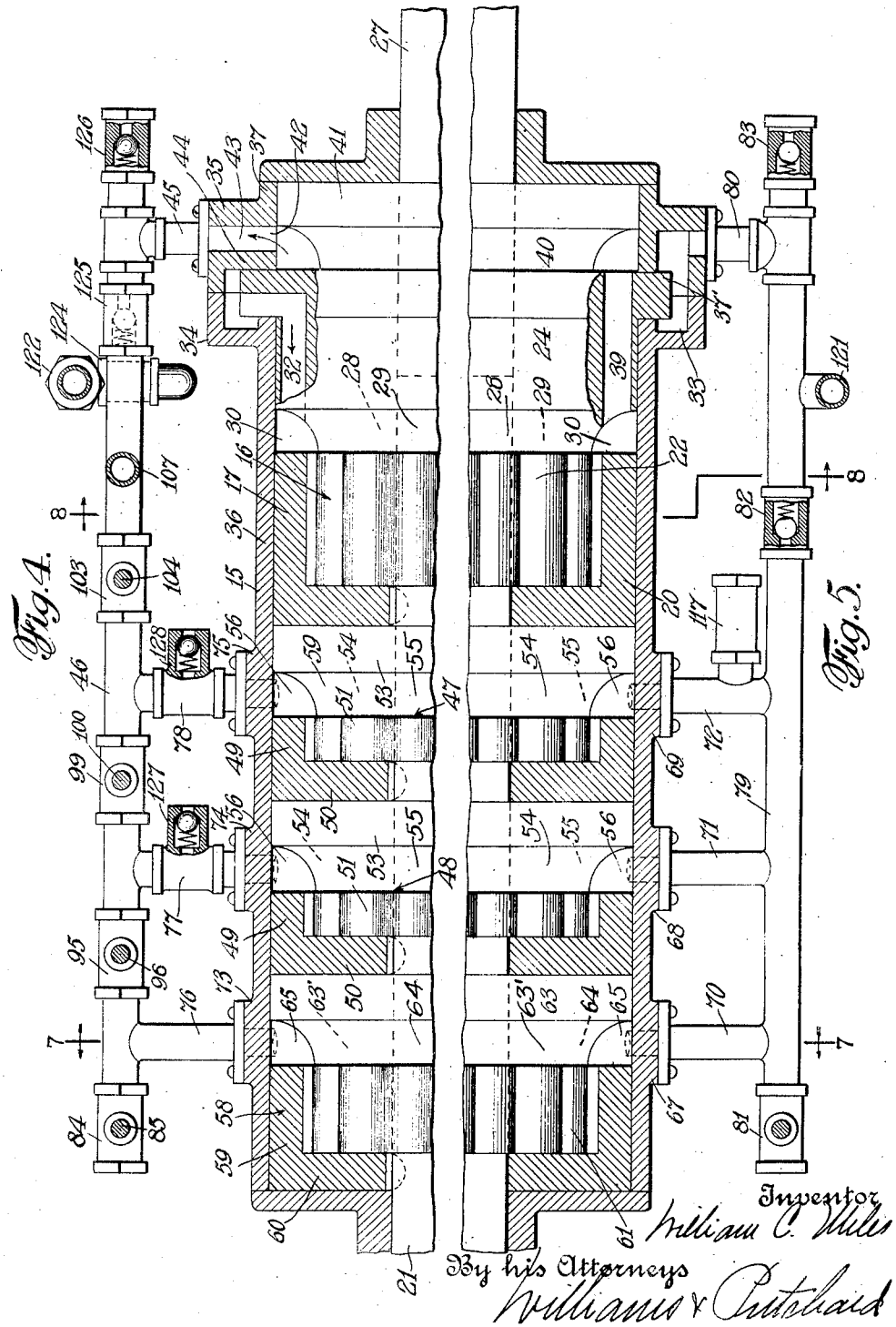

Oct. 30, 1928.  
W. C. MILES  
1,690,086  
TRANSMISSION  
Filed July 11, 1923  5 Sheets-Sheet 4

Inventor  
William C. Miles  
By his Attorneys  
Williams & Pritchard

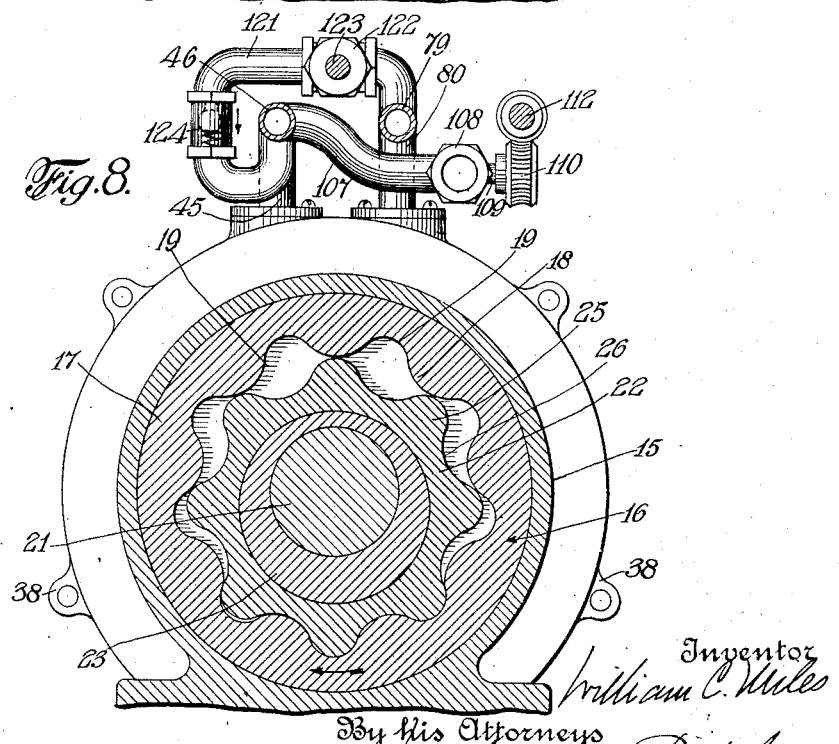

Patented Oct. 30, 1928.

1,690,086

UNITED STATES PATENT OFFICE.

WILLIAM C. MILES, OF NEW YORK, N. Y.

TRANSMISSION.

Application filed July 11, 1923. Serial No. 650,760.

This invention relates to variable speed transmissions of the fluid type having a driving and a driven member.

An important object of the invention is to provide, in a device of the character mentioned, an improved means for effecting a variable relative speed of rotation between the driving and driven members.

A further object of the invention is to provide, in a device of the character mentioned in which a fluid clutch is employed and in which variable speed of rotation between the driving and driven members is effected by reason of the escape of variable quantities of fluid under pressure from the clutch, an improved means for utilizing the escaping fluid to facilitate rotation of the driving member and thereby effect efficient operation of the transmission as a unit.

Another object of the invention is to provide, in a device of the character mentioned, an improved means for controlling the transmission in its operation to meet varying conditions incident thereto.

Other objects and certain advantages of the invention will become apparent from the following description when taken in connection with the accompanying drawings, in which Figure 1 is a perspective view of the transmission embodying my invention.

Figure 2 is a top plan view of an automobile chassis having the transmission embodying my invention associated therewith, the reservoir cover being removed.

Figure 3 is a central longitudinal sectional view through the chassis and reservoir, the transmission being shown in elevation.

Figure 4 is a sectional view taken on line 4—4, of Figure 7, the sub-section being shown in section at its point of connection with the outlet pipe.

Figure 5 is a sectional view taken on the line 5—5, of Figure 7, the sub-section being shown in section at its union with the inlet pipe.

Figure 7 is a transverse sectional view taken on line 7—7, of Figures 4 and 5.

Figure 8 is a transverse sectional view taken on line 8—8, of Figures 4 and 5.

Figure 6:
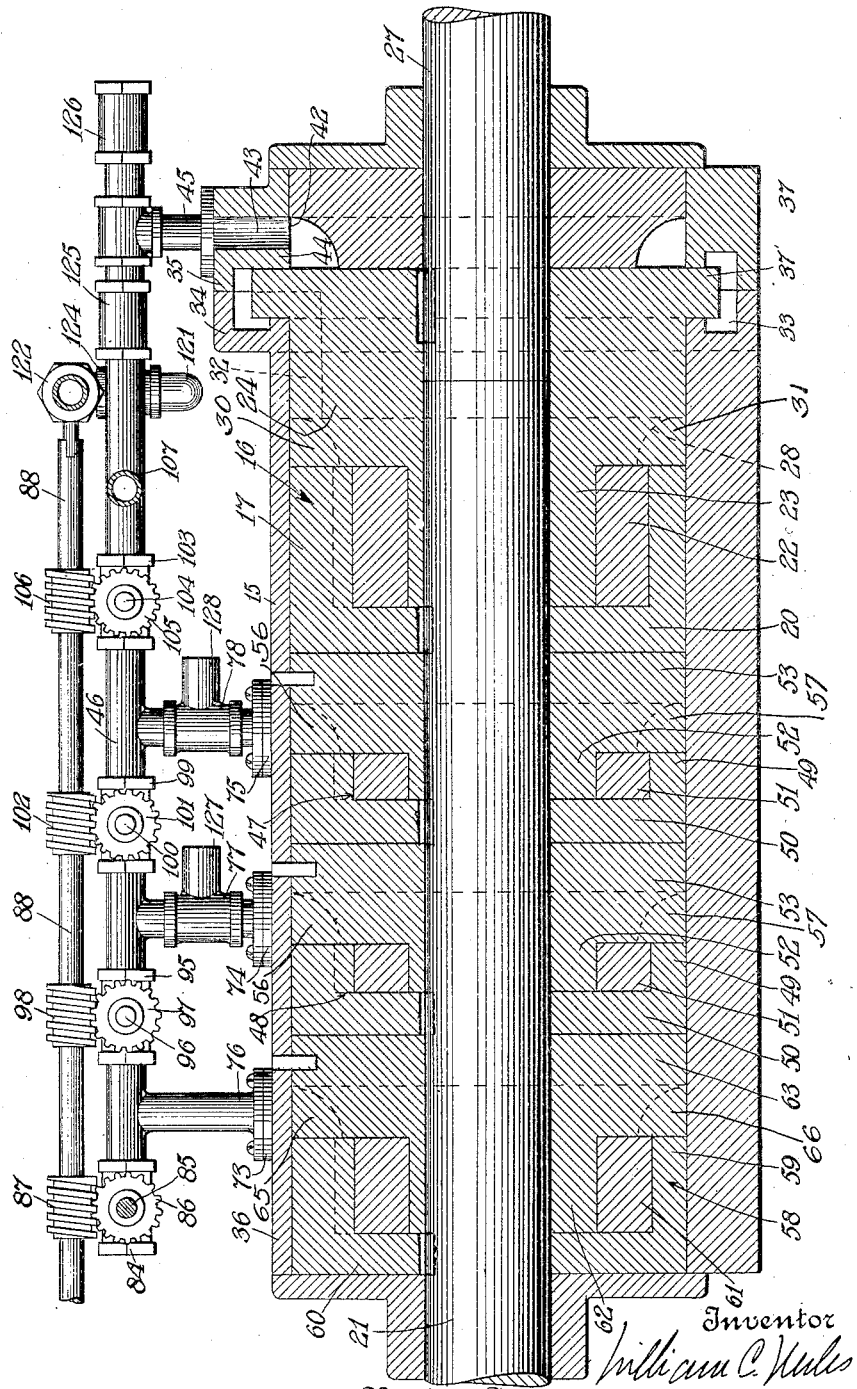
Figure 6 is a longitudinal sectional view looking from the right in Figure 1.

Referring to the drawings, the device embodying my invention and indicated as a whole by the numeral 10, is shown associated with an automobile chassis, 11, and operatively connected to the engine 12 and to the universal joint 13 which, in turn, is adapted for connection with the traction wheels, not shown, through the conventional propeller shaft also not shown.

The trasmission as a unit is arranged within a reservoir 14 attached to the chassis and adapted for the reception of a quantity of oil sufficient in depth to submerge the several transmission inlets, ports or passages, hereinafter more particularly referred to, and comprises an elongated housing 15 formed with a base 15', the housing being bored or otherwise finished to provide a smooth internal surface.

Within the housing 15, there is arranged a clutch unit 16 comprising a rotor 17 having a plurality of inwardly projecting lobes 18, between which indentures or recesses 19 are formed, the rotor being secured or formed integral with a circular plate 20 connected to and adapted to rotate with a drive-shaft 21 which, in turn, is connected to the crank shaft not shown, of the engine 12. Within the rotor 17, there is arranged a floating piston or ring 22, adapted to readily rotate upon a boss 23 disposed eccentrically with respect to the shaft 21 and secured to or formed integral with a rotatably driven clutch member 24. The rotatable piston or ring 22 is provided peripherally with a plurality of projections or lobes 25, herein shown as eight, between which are formed a corresponding number of pockets 26, the lobes 25 being adapted to fit into the pockets 19, herein shown as nine, whereas the pockets 26 are adapted to receive the lobes 18, herein shown as nine, as the shaft 21 is rotated, thereby effecting relative rotation between the rotor 17 and the piston or ring 22, the latter of which, as above mentioned, is adapted to freely rotate upon the eccentric 23. As the shaft 21 is rotated thereby carrying with it the rotor 17, in the direction of the arrow shown in Figure 8, the piston or ring 22 is rotated in a corresponding direction effecting an opening of the pockets 19 and 26 through the in-take arc of approximately 180° to the left of the vertical center line of Figure 8, and simultaneously effecting a closing of these pockets through the outlet arc of approximately 180° to the right of the center line, this operation being made possible by reason of the peculiar contour of the lobes 18 and 25 and the pockets 19 and 26.

The driven clutch member 24 is disposed in alinement with the rotor 17 and is adapted for the reception of one end of the shaft 21 within which the same is journaled and maintained in direct alinement with the driven shaft 27 keyed or otherwise rigidly connected to the clutch member 24 so as to rotate therewith. This clutch member is cut away peripherally to provide an arcuate-shaped inlet groove 28 and a similar outlet groove 29 separated by abutments 30 and 31. The inlet groove 28 is, by means of a passage 32, formed in the clutch member 24, maintained in communication with an annular chamber 33 provided upon the periphery of the housing 15 by adjoining flanges 34 and 35 carried, respectively, by the main section 36 of the housing 15, and the sub-section 37, which sections are adapted to be connected in an end to end relation by means of bolts, not shown, passed through a plurality of ears 38 carried by the flanges 34 and 35. It will be noted that the clutch member 24 is provided at one end thereof with an annular flange 37' disposed intermediate the adjoining ends of the sections 36 and 37 and projecting slightly into the chamber 33 with which the passage 32 communicates. By reason of this construction, the passage 32, regardless of any change in position of the same due to rotation of the clutch member 24, is always maintained in communication with the chamber 33 to which oil or other fluid medium is supplied in the manner hereinafter more particularly pointed out.

In order to provide for the egress of fluid which is compelled to escape due to the closing of the pockets 19 and 26 effected by the relative rotation between the rotor 17 and the piston or ring 22, as above mentioned, an outlet passage 39 is provided in the clutch member 24, which maintains communication between the outlet groove 29 and an annular channel 40 formed in a plate 41 to which the driven shaft 27 may be either rigidly secured or journaled therein. This annular groove 40 is, under all conditions, maintained in communication through a port 42, with an outlet passage 43 formed in the flange 35 and separated from the annular chamber 33 by a division wall 44, the outlet passage 43 being, in turn, maintained in communication with an outlet pipe 45 which, in turn, is connected with a return pipe 46.

In order that predetermined quantities of fluid acted upon within the clutch unit previously described may be measured off and the energy used to advantage in facilitating the propulsion or driving of the shaft 21, I have provided a pair of measuring devices 47 and 48. Each of these measuring devices comprises a rotor 49, differing only from the one indicated by the numeral 17 and hereinbefore described in that it is only one-third as wide as the rotor 17. These rotors 49 are connected with or formed integral with plates 50 keyed or otherwise fastened to the shaft 21 and adapted to rotate therewith. Co-operating with the rotors 49 are rotatable pistons or rings 51 differing from the piston or ring 22 hereinbefore described in that each is only one-third as wide as the previously described piston. These pistons or rings 51 are journalled upon the stub-shafts or bosses 52 eccentrically secured to or formed integral with stationary plates 53 which may be secured to the casing or housing 15 by any suitable means. It will be noted that the plates 53 are grooved to provide in-take passages 54 and outlet passages 55 separated by means of abutments 56 and 57 similar to those indicated by the numerals 30 and 31 and hereinbefore described.

In alinement with the measuring devices 47 and 48, there is arranged a pumping unit 58 comprising a rotor 59, formed integral with or otherwise attached to a plate 60 secured to the shaft 21 and adapted to rotate therewith. This rotor differs from those indicated by the numerals 17 and 49 only in dimension, it being twice as wide as either of the rotors 49 and two-thirds as wide as the rotor 17. A floating ring or piston 61 is mounted upon a stub-shaft or boss 62 carried by a plate 63 and disposed in an eccentric relation with respect to the shaft 21. This floating ring or piston 61 differs from those indicated by the numerals 22 and 51 only in dimension, it being twice as wide as either of the rotors 51 and two-thirds as wide as the rotor 22. The plate 63 like the plates 53 is suitably attached to the casing 15 and is provided with peripheral grooves or inlet and outlet passages 63' and 64 separated by means of abutments 65 and 66. The fluid delivered by this pumping unit, as will hereinafter more clearly appear, is utilized only when it is desired to effect a reversal of the driven shaft 27, its delivery being then combined with the delivery of the measuring devices 47 and 48 hereinbefore described.

The housing 15 is provided with a plurality of bosses 67, 68 and 69 adapted to receive conduits or pipes 70, 71 and 72, respectively, the pipe 70 being maintained in communication with the outlet passage or groove 64 of the pumping unit 58, whereas the pipes 71 and 72 are adapted to communicate with the outlet passages or grooves 55 of the measuring devices 47 and 48. Upon the casing 15 and adjacent the bosses just mentioned, there is formed another series of bosses 73, 74 and 75, adapted to receive conduits or pipes 76, 77 and 78, the pipe 76 being adapted to communicate with the in-take groove or passage 63' of the pump unit 58 whereas the pipes 77 and 78 are adapted to communicate with the in-take grooves or passages 54 of the measuring devices 47 and 48. Connected to the upper or outer ends of the pipes 70, 71, and 72 and communicating therewith, is a conduit or pipe 79. This conduit or pipe 79 which is adapted to communicate with the outlet grooves or passages of the pump 58 and measuring devices 47 and 48 is also maintained in communication with the annular chamber 33 through a pipe 80, the annular chamber being, through the passage 32, maintained in communication, under all conditions, with the inlet groove or passage 28 of the clutch unit. To one end of the pipe 79 there is connected a suitable rotatable valve indicated as a whole by the numeral 81, which valve is so rotated, through suitable control mechanism hereinafter more particularly described, as to effect a reversal of the driven shaft 27 by closing the normal discharge end of the pipe 79 and thus causing the fluid delivered by the pump unit 58 and measuring devices 47 and 48 to enter the in-take groove or channel 28 of the clutch unit by way of the pipe 80, annular chamber 33 and in-take passage 32.

The pipe 79 is provided with a pair of check-valves 82 and 83, the former of which is disposed intermediate the pipes 72 and 80, whereas the other is carried upon the end of the pipe 79 adjacent the pipe 80. These check-valves are of the spring-pressed type and are adapted to open and close under certain conditions which will hereinafter more clearly appear, it being sufficient to mention at this time that the check-valve 82 is adapted to permit the passage of fluid from the pipes 70, 71 and 72, into the pipe 80, whereas the valve 83 is designed to permit the fluid to enter the pipe 80 directly from the reservoir.

The return pipe 46 hereinbefore referred to is connected to the upper ends of the pipes 76, 77 and 78 and is adapted to establish communication between the outlet groove or channel 29 of the clutch unit and the inlet grooves 54 of the measuring devices 47 and 48 and the inlet groove or channel 63' of the pumping unit 58. The pipe 46 at one end carries a rotary valve 84 corresponding to the rotary valve 81 hereinbefore mentioned. These two rotary valves, namely, 81 and 84, are connected together by means of a valve-stem 85 to which is connected a worm-gear 86 adapted to mesh with a worm 87 carried by a shaft 88 suitably journalled within the reservoir 14. This shaft is provided at one end with a beveled gear 89, which in turn meshes with a beveled gear 90 carried by a shaft 85' provided with a beveled gear 86'. The gear 86' meshes with a gear 87' secured to a shaft 88' which carries a gear 89' meshing with a gear 90' carried by a manually controlled shaft 91 extending through the steering post 92. This shaft is provided with an operating handle 93 in proximity to which is arranged an arcuate shaped segment 94 carrying the letters "R", "N" and the numerals "1", "2" and "3", indicating respectively the reverse, neutral, first, second and third speed positions of the several valves operated through the shaft 88 and hereinafter more particularly described.

Intermediate the pipes 76 and 77 there is disposed a rotary valve 95 provided with a valve-stem 96 carrying a worm-gear 97 meshing with a worm 98 carried by the shaft 88. Between the pipes 77 and 78 there is arranged another rotary valve 99 having a valve stem 100 carrying a worm-gear 101 meshing with a worm 102 secured to the shaft 88. Between the pipes 78 and 45 there is disposed another rotary valve 103 having a valve-stem 104 to which is connected a worm-gear 105 meshing with a worm 106 connected to the shaft 88. These rotary valves, namely, 95, 99, 103, being operatively connected with the shaft 88 are adapted to be so rotated through the instrumentality of the control lever or handle 93 as to effect a change from first speed to third speed, as will hereinafter more clearly appear.

In order to suddenly relieve any pressure within the pipe or conduit 46 regardless of whether the transmission is operating in first, second or third speeds, I have provided a relief pipe 107 connected to the pipe 46 intermediate the valve 103 and the pipe 45. This relief pipe is provided at its outer end with a rotary valve 108 carrying a valve stem 109 to which is connected a worm-gear 110 meshing with a worm 111 carried by a shaft 112 to which is connected a beveled gear 113. This beveled gear meshes with a beveled gear 114 operatively connected to a foot-lever 115 of the usual type which is adapted to be connected, with the conventional type of automobile brake, not shown, to effect an application of the brakes when it is desired to bring the automobile to rest. It will be appreciated from this construction that, when the transmission is operating in either first, second or third speed, upon application of the brake through the foot-lever 115, the valve 108 is so rotated through the shaft 112 as to relieve the pressure within the pipe 46. Not only is it necessary in a transmission of the type shown herein to provide means for releasing the pressure within the pipe 46 when operating in either first, second or third speed; but it is also necessary to provide similar means for releasing the pressure within pipe 79 so that the automobile may be quickly brought to rest upon application of the brake through the foot-lever 115 when the transmission is operating in reverse, and in order to accomplish this desired result I provide a relief pipe 116 connected with the pipe 72, the relief pipe being provided with a rotary valve 117 having a valve-stem 118 to which is connected a worm-gear 119. This worm-gear is maintained in engagement with a worm 120 carried by the shaft 112. By this construction it will be appreciated that when the automobile brake is applied through the instrumentality of the foot-lever 115, not only is the valve 108 opened but also the valve 117 and consequently all driving force is relieved from the driven shaft 27 regardless of whether the transmission is operating in reverse or in any one of the forward speeds.

Leading from the pipe 46 to the pipe 79 is a by-pass in the form of a pipe 121 which is provided wth a rotary valve 122, having a shaft 123 which is connected to the shaft 88, the valve 122 being therefore adapted to be operated simultaneously with the valves 81, 84, 95, 99 and 103. Intermediate the valve 122 and the conduit 46, I have arranged a check valve 124 of the spring-pressed type so operating as to permit fluid under certain conditions to pass from the pipe 79 into the pipe 46. Intermediate the pipes 45 and 121 is disposed a check-valve 125 of the spring-pressed type adapted to permit the passage of fluid from the clutch unit through the pipe 46 and into either or both of the measuring devices or the pump unit 59 or back into the reservoir, as the case may be. To the end of the pipe 46, there is connected a compensating valve 126 of the spring-pressed check type adapted to permit the entrance of fluid to what is normally the outlet groove or channel 29 of the clutch unit when the same becomes the inlet channel the instant the driven shaft 27 tends to rotate faster than the drive-shaft 21. Such a condition occurs when, for example, the automobile is descending a grade and the engine is throttled down so that the traction wheels of the automobile rather than the engine thereof are, in effect, rotating the shaft 27. When what is normally the outlet passage 29 becomes the inlet passage, what is normally the inlet passage 28 simultaneously becomes the outlet passage so that the fluid admitted through valve 126 to passage 39 is delivered through the outlet port 32, the annular chamber 33 and pipe 80 to the pipe 79. By reason of the fact that valves 82 and 83 are closed under such condition, the fluid under pressure is transmitted through the pipe 121, when the valve 122 is open, to the pipe 46 from which it is delivered to the in-take grooves or channels 54 of either or both of the measuring devices 47 and 48 depending upon whether or not the transmission is operating in first or second speed. It will be noted, also, that under such condition the check-valve 125 is closed and the check-valve 124 is opened.

Under certain conditions of operation, it is necessary to provide auxiliary inlets for the measuring devices 47 and 48, and to this end I have provided the pipes 77 and 78 with in-take valves 127, and 128, respectively, of the spring-pressed check type adapted to open to permit the ingress of fluid under certain conditions, and to close under certain other conditions as, for example, when the valve 95 is closed and fluid under pressure is being delivered from the clutch unit to the measuring devices 47 and 48.

The operation of the device is as follows:

With the hand-operating lever 93 maintained at neutral position, as indicated at "N" on the arcuate-shaped segment 94, the several rotary valves 81, 84, 95, 99, 103 and 122 are opened. If the engine 12 is operating with the valves so set and the shaft 27 is held against rotation, as by friction or otherwise, the clutch unit will receive its supply of fluid through the pipe 79 from the quantity of fluid delivered by the pump unit 58 and measuring devices 47 and 48. The amount thus delivered is in excess, by one-third, of that required by the clutch unit, since the rotors are equal in diameter and the width of the rotor 17 is only three-quarters that of the combined width of the rotors 49 and 59. The amount of fluid delivered by the pumping unit 58 and measuring devices 47 and 48 which is in excess of the amount required to supply the clutch unit, is discharged into the reservoir 14 through the valve 81. While the clutch unit is running free—that is to say, when the hand-operated lever 93 is maintained in its neutral position and the shaft 27 is at rest, the fluid delivered to the clutch unit is subsequently ejected therefrom through the outlet passage 43 and pipe 45 into the pipe 46. The amount of fluid, however, ejected from the clutch unit being only three-quarters of that delivered by the pump unit 58 and measuring devices 47 and 48, is insufficient by one-third to satisfy the requirements of the pump unit 58 and measuring devices 47 and 48, but this additional one-third is permitted to enter by way of the rotary valve 84, or any one or all of the check-valves 126, 127, 128.

The next step under normal conditions in the starting of an automobile from rest would be to so actuate the several valves through the instrumentality of the control lever 93 as to obtain first speed, and the next step would be to further operate the several valves so as to obtain second speed after which the valves are again advanced to obtain third speed or direct drive between the drive-shaft 21 and the driven shaft 27. For the purpose of clearness, however, in the description of the operation, it will be assumed that the transmission is now operating in high speed, or on direct drive, after which the necessary steps will be described to effect operation on second speed, then first speed and finally to place the transmission in a neutral state.

When operating on high speed or direct drive with the control lever 93 in third speed position indicated by the numeral "3", valves 81, 84, 95, 99 and 122 are open, whereas valve 103 is closed. Under such condition, the pump unit 58 and measuring devices 47 and 48 receive their supply of fluid through the valve 84 and discharge the same back into the reservoir 14 through the valve 81, with very little impedance and consequently at the expense of but a small fraction of the energy applied to the drive-shaft 21. Since the valve 103 is closed, circulation of oil through the clutch unit is prevented and consequently the rotatable clutch member 24 is locked with respect to the rotor 17 due to the impinging force exerted on the fluid within the pockets 19 and 26 of the rotor 17 and piston 22, respectively, adjacent the outlet groove or passage 29 which is normally maintained in communication with the pipe 46 through the annular groove 40, outlet passage 43 and pipe 45. If, under these conditions, it should become necessary to supply a compensating quantity of fluid to the in-take passage or groove 28 due to any "slippage" which might occur between the rotor 17 and the clutch member 24 as the result of more or less leakage of fluid, either the check-valve 82 or check-valve 83 will operate to permit the ingress of the amount of compensating fluid required.

In transmissions of this type, particularly when used in connection with automobiles, the driven member in effect becomes a driving member when, for example, the engine power is reduced and the automobile is permitted to "drift" down an incline. Under such conditions, the groove 28 which is normally the in-take groove, becomes the outlet groove and simultaneously the groove 29 which is normally the outlet groove becomes the inlet groove due to the peculiar construction of the clutch unit which I employ. Notwithstanding this fact, however, the shaft 21 still remains locked to the shaft 27 by reason of the fact that the fluid now under pressure within the passage 28 cannot escape into the reservoir 14 for the reason that the check-valves 82 and 83 prevent such release. The valve 122 of pipe 121 connecting the pipes 46 and 79, is open when direct drive between the shafts 21 and 27 is maintained, but the fluid under pressure within the pipe 121 cannot escape for the reason that the valve 103, as previouesly described, is closed and the check-valve 125 serves to prevent its release or transferal through the pipe 45 to what is now the inlet passage or groove 29. In order to compensate for any "slippage" when the shaft 27 is functioning to drive the shaft 21 which might occur as the result of more or less escape of oil back into the reservoir 14, I have provided the check-valve 126 hereinbefore mentioned, which is adapted to open under such condition and permit the ingress of compensating fluid into the passage or groove 29 through the pipe 45, outlet passage 43, groove 40 and outlet passage 39.

Assuming that it is now desired to operate the transmission in second speed, the operating lever 93 is moved to second speed position, indicated by the numeral "2" on the arcuate shaped segment 94, thereby gradually opening valve 103 and simultaneously closing valve 99, all of the other rotary valves (except 108 and 117) namely, 81, 84, 95, and 122 being permitted to remain open. By opening the valve 103, a relative rotary motion is established between rotor 17 and the clutch member 24 due to the fact that the clutch unit, now acting as a pump, is required to deliver to the measuring device 47, a quantity of fluid sufficient to satisfy its need, and consequently the speed of the shaft 27 is reduced one-third with respect to that of the shaft 21. If this fluid which is ejected from the clutch unit under pressure were permitted to escape directly into the reservoir, a material loss of energy woud result, but with the device embodying my invention, the energy stored within this ejected fluid is utilized to facilitate rotation of the shaft 21, since the measuring device 47 is now functioning as a motor, the in-take passage 54 of which receives the fluid delivered from the clutch unit under pressure. The fluid thus delivered expends its energy upon the rotor 49 and thereby facilitates the driving of the drive-shaft 21, the exhaust fluid being ejected into the pipe 79 from which it passes in to the reservoir 14. While the transmission is operating in second speed, if the driven shaft 27 should function under conditions above mentioned as a drive-shaft, the groove 28 which is normally the inlet groove becomes the outlet groove, and the groove 29 which is normally the outlet groove becomes the inlet groove, as previously described, and the clutch unit now functioning as a pump receives its supply of fluid through the check-valve 126 and delivers the same after being acted upon, through the pipe 80 to the pipe 79. The valves 82 and 83 being closed under such condition, the fluid ejected from the clutch unit is transmitted through the pipe 121 and check-valve 124 to the in-take groove 54 of the measuring device 47 through the pipe 78, in which case the measuring device 47 still functions as a motor of which the rotor 49 connected to the shaft 21 constitutes the driven member.

In order now to cause the transmission to function in first speed, the operating handle 93 is moved to first speed position, indicated by the numeral "1" on the arcuate-shaped segment 94, thereby opening valve 99 and simultaneously closing valve 95, the remainder of the rotory valves (except those indicated by the numerals 108 and 117) namely, 81, 84, 103 and 122, being permitted to remain open. The clutch unit continues to function as a pump and is called upon to furnish a sufficient quantity of fluid to the measuring devices 47 and 48 to meet their combined need and as the result of such, an increased relative speed of rotation is effected between the rotor 17 and clutch member 24 to such an extent that the driven shaft 27 is caused to rotate one-third as fast as the drive-shaft 21. The fluid passing into the in-take groove 28 of the clutch unit through either or both of the check-valves 82 and 83, the pipe 80, the chamber 33 and passage 32, is expelled from the outlet groove 29 through the passage 39 into the groove 40 from which it is directed through outlet passage 43 and the pipe 45 into pipe 46 and thence into the in-take passages 54 of the measuring devices 47 and 48. The fluid, thus supplied to the measuring devices 47 and 48 after having been acted upon by the clutch unit functioning as a pump, is under more or less pressure and its energy is utilized to facilitate driving the drive-member 21, inasmuch as the measuring devices 47 and 48 now function as motors, in which the rotors 49 connected to the shaft 21 constitute the driven members. The fluid after having expended its energy within the measuring devices 47 and 48 to facilitate rotation of the shaft 21, is ejected from the outlet grooves 55 thereof through the pipes 71 and 72 into the pipe 79 from which it is free to pass either into the reservoir 14 or the in-take groove 28 of the clutch unit. While the transmission is operating in first speed, if the driven shaft 27 should function under conditions above mentioned as a drive-shaft, the groove 28 which is normally the inlet groove, becomes the outlet groove, and the groove 29 which is normally the outlet groove, becomes the inlet groove, as previously described, and the clutch unit now functioning as a pump receives its supply of fluid through the check-valve 126 and delivers the same after being acted upon, through the pipe 80 to the pipe 79. The valves 82 and 83 being closed under such condition, the fluid ejected from the clutch unit is transmitted through the pipe 121 and check-valve 124 to the intake grooves 54 of the measuring devices 47 and 48 through the pipes 77 and 78, in which case the measuring devices 47 and 48 still function as motors, in each of which the rotor 49 connected to the shaft 21 constitutes the driven member.

By further moving the control lever 93, its neutral position, indicated by "N" on the arcuate segment 94, is reached, in which position, as above explained, the valves 81, 84, 95, 99, 103 and 122 are maintained open with the result that the shaft 27 is maintained stationary as previously described.

In order to reverse the rotation of the shaft 27, the operating handle 93 is moved to reverse position indicated by "R" on the arcuate shape segment 94, thereby closing rotary valves 81, 84 and 122, the remainder of the valves (with the exception of those indicated by the numerals 108 and 117), namely, 95, 99 and 103 being permitted to remain open. The measuring devices 47 and 48 now together function with the pump unit 58 as pumps to supply fluid under pressure to the in-take groove 28 of the clutch unit which now functions as a motor. As previously mentioned, the combined delivery of the pump unit 58 and measuring devices 47 and 48 is greater than that of the clutch unit by one-third, and it is this excess that I utilize to effect the reversal of the shaft 27 when the clutch unit is functioning as a motor.

It is due to the peculiar construction and arrangement of the rotor 17, piston 22, clutch member 24, and eccentric boss 23, comprising the clutch unit, that I am enabled to reverse the shaft 27 by supplying to the in-take groove 28 of the clutch unit a quantity of fluid in excess of that which would normally enter the same if the shaft 27 remained stationary while the shaft 21 is being rotated as, for example, when the several rotary valves are maintained in their respective neutral positions. When this excess fluid is supplied to the in-take groove 28 of the clutch unit, the rotor 17 and piston 22 so co-operate, as the result of the pressure exerted thereupon within the pockets 19 and 26 adjacent the in-take groove 28, that the axis of the eccentric boss 23 rotates about the axis of the alined shafts 21 and 27 in a direction opposite to that of the shaft 21. The boss 23 rotating as it does in a direction opposite to that of the shaft 21 necessarily carries with it the clutch member 24 in a corresponding direction thereby effecting a reversal of the shaft 27. The fluid ejected from the outlet groove 29 of the clutch unit passes through the outlet passage 39 and into the groove 40 from which it is passed through the outlet passage 43 and pipe 45 back into the pipe 46. When the valve 84 is closed and the pump unit 58 and the measuring devices 47 and 48 are functioning collectively as pumps, they, as such, may receive through any one or all of the check-valves 126, 127 and 128 any required compensating fluid necessitated, for example, by more or less leakage of oil back into the reservoir 14. Should the driven shaft 27 while the transmission is operating in reverse, under any condition, tend to rotate faster than one-third the speed of the drive-shaft 21 and thus function as a drive-shaft, the fluid which is being expelled from the clutch unit is placed under pressure and the pump unit 58 and measuring devices 47 and 48, which receive this fluid at their respective in-take sides, therefore, function as motors to facilitate the driving of the shaft 21. Under such conditions of operation, any compensating fluid required by the clutch unit to make up for leakage back into the reservoir 14 may be supplied to the clutch unit through the check valve 83.

I claim:

1. In a transmission, a fluid clutch unit having fluid inlet and outlet ports and comprising driving and driven members adapted to become driven and driving members, respectively, a fluid measuring device having a rotatable element connected to one of said clutch members, said measuring device being provided with an inlet port adapted to communicate with one of the ports of said clutch unit, and means operable when said driving element becomes a driven element to sever communication between the inlet port of said measuring device and one of the ports of said clutch unit and place the other port of said clutch unit in communication with the inlet port of said measuring device.

2. In a transmission, a fluid clutch unit having fluid inlet and outlet ports and comprising driving and driven members adapted to become driven and driving members, respectively, means for utilizing the discharged fluid from said clutch unit to facilitate rotation of said driving member, said means being in the form of motors having inlet ports adapted to communicate with one of the ports of said clutch unit and provided with rotatable elements connected to one of said clutch members, and means operable when said driving and driven members become driven and driving members, respectively, to sever communication between one port of said clutch unit and the inlet ports of said motors and place the other port of said clutch unit in communication with the inlet ports of said motors.

3. In a transmission, a fluid clutch unit having fluid inlet and outlet ports and comprising driving and driven members adapted to become driven and driving members, respectively, fluid measuring devices, each having a rotatable element connected to one of said clutch members, each of said measuring devices being provided with an inlet port adapted to communicate with one of the ports of said clutch unit, means operable when said driving element becomes a driven element to sever communication between the inlet ports of said measuring devices and one of the ports of said clutch unit and place the other ports of said clutch unit in communication with the inlet ports of said measuring devices, and means for severing communication between said clutch unit and one or both of said measuring devices to effect a variation in the relative speed of rotation between said clutch members.

4. In a transmission, a fluid clutch unit having fluid inlet and outlet ports and comprising driving and driven members adapted to become driven and driving members, respectively, means for utilizing the discharged fluid from said clutch unit to facilitate rotation of one of said clutch members, said means being in the form of motors having inlet ports adapted to communicate with one of the ports of said clutch unit and provided with rotatable elements connected to one of said clutch members, means operable when said driving and driven members become driven and driving members, respectively, to sever communication between one port of said clutch unit and the inlet ports of said motors and place the other port of said clutch unit in communication with the inlet ports of said motors, and means for severing communication between said clutch unit and one or all of said motors to effect a variation in the relative speed of rotation between said clutch members.

5. In a transmission, a fluid clutch unit having fluid inlet and outlet ports and comprising driving and driven members adapted to become driven and driving members respectively, means for utilizing the discharge fluid from said clutch unit to facilitate rotation of said driving member, said means being in the form of a motor having an inlet port adapted to communicate with one of the ports of said clutch unit and provided with a rotatable element connected to one of said clutch members, and means operable when said driving and driven members become driven and driving members, respectively, to sever communication between one port of said clutch unit and the inlet port of said motor, and place the other port of said clutch unit in communication with the inlet port of said motor.

6. In a transmission, a fluid clutch unit having fluid inlet and outlet ports and comprising driving and driven members adapted to become driven and driving members respectively, means for utilizing the discharge fluid from said clutch unit to facilitate rotation of said driving member, said means being in the form of a motor having an inlet port adapted to communicate with one of the ports of said clutch unit and provided with a rotatable element connected to one of said clutch members, means operable when said driving and driven members become driven and driving members, respectively, to sever communication between one port of said clutch unit and the inlet port of said motor, and place the other port of said clutch unit in communication with the inlet port of said motor, and means for severing communication between said clutch unit and said motor to effect a variation in the relative speed of rotation between said clutch members.

In testimony whereof, I have affixed my signature to this specification.

WILLIAM C. MILES.